Jan. 7, 1964   A. KAMPFF   3,116,709
ATOMIC POWERED DIRECT THRUST VESSEL
Filed July 8, 1960   3 Sheets-Sheet 1
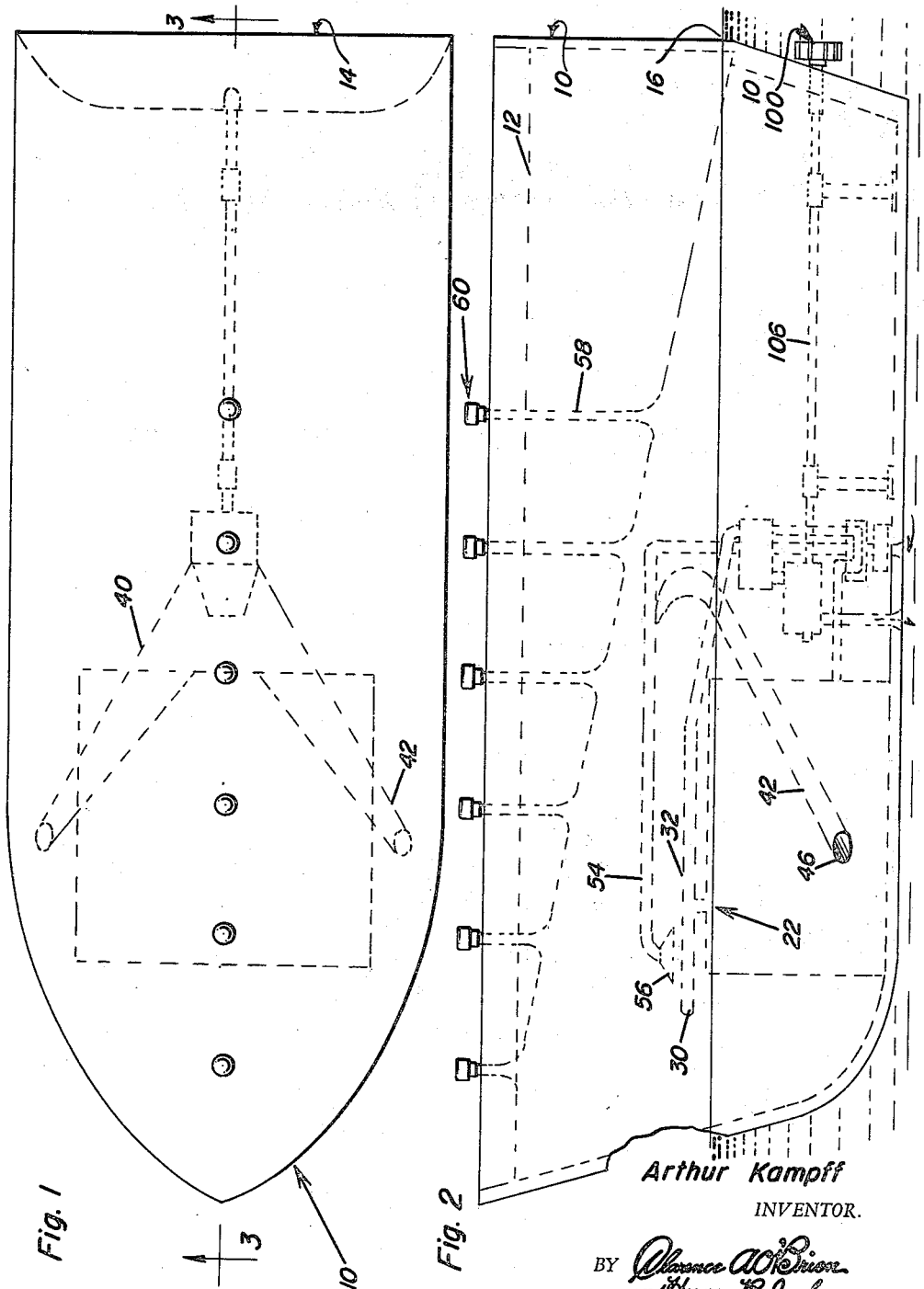
Arthur Kampff
INVENTOR.
BY Clarence A. O'Brien
and Harvey B. Jackson
Attorneys Arthur Kampff, INVENTOR.

Jan. 7, 1964 A. KAMPFF 3,116,709
ATOMIC POWERED DIRECT THRUST VESSEL
Filed July 8, 1960 3 Sheets-Sheet 3
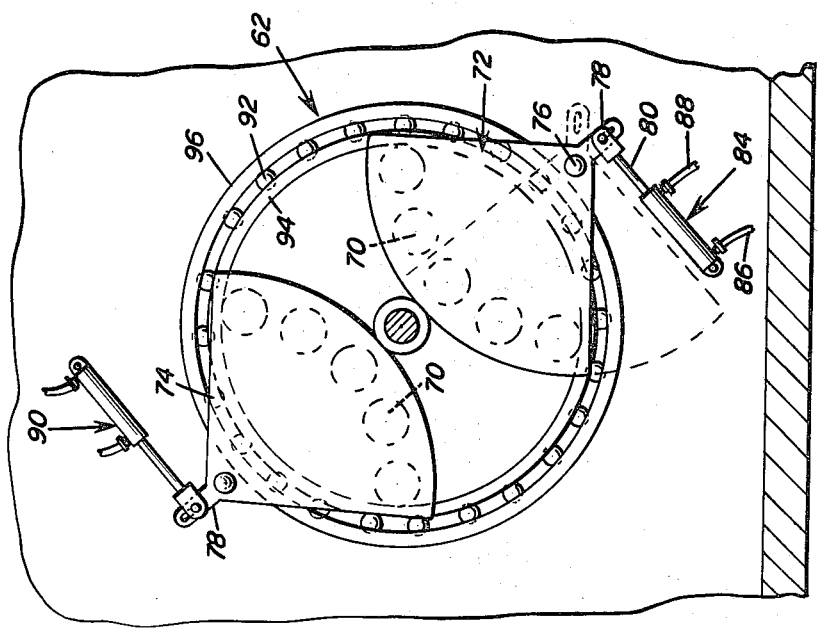
Fig. 6
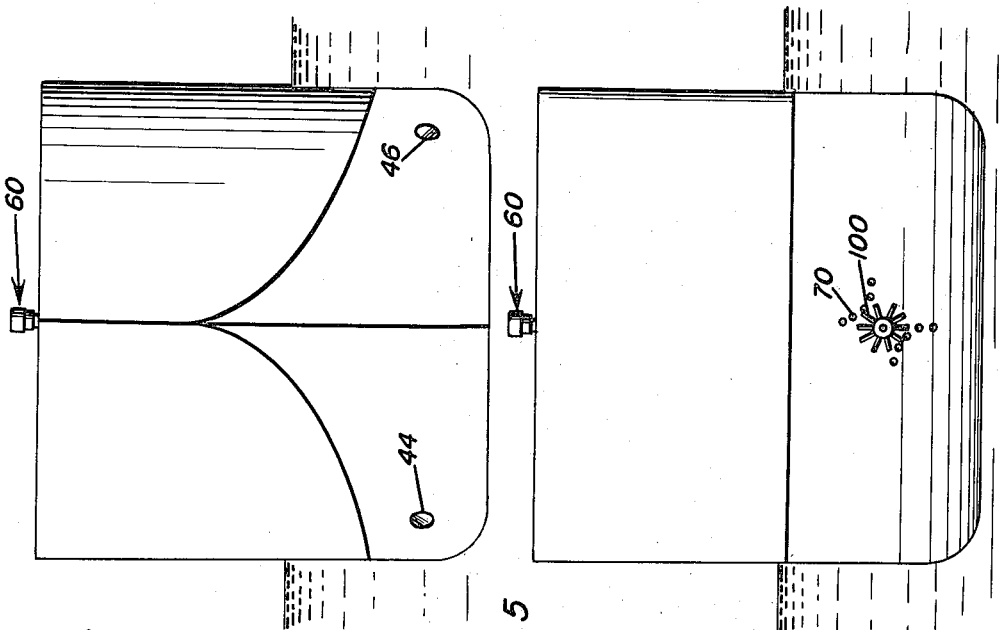
Fig. 4
Fig. 5
Arthur Kampff, INVENTOR.
BY *Clarence A. O'Brien*
and *Harvey B. Jacobson*
Attorneys

3,116,709
ATOMIC POWERED DIRECT THRUST VESSEL
Arthur Kampff, Paterson, N.J. (P.O. Box 319, % Pompton Lake Nursing Home, Pompton Lakes, N.J.)
Filed July 8, 1960, Ser. No. 41,597
7 Claims. (Cl. 115—11)

This invention relates generally to means for propelling surface vessels and submersibles through a body of water and more particularly to vessel propulsion effected by direct thrusts of escaping steam generated in the vessel, against the water in the wake of the vessel.

It is appreciated that conventional surface vessels and submersibles are driven by steam turbines or such which in turn rotates shafts and blade propellers for motivating a vessel through a body of water. The invention herein proposes the elimination of the conventional drive means and substitution therefor of a less expensive and simpler system employing direct thrust of generated steam against the water in the wake of the vessel for propelling the vessel forwardly. The steam is generated within the vessel by any appropriate means but the invention particularly contemplates the utilization of a thermal atomic reactor positioned within the vessel for providing intense heat in an explosion chamber defined in the vessel for causing explosions and steam generations when cold water is drawn into the chamber and made to contact high temperature units heated by coolants carrying intense heat from the atomic reactor.

Accordingly, it is the principal object of this invention to provide novel thrust propulsion means for surface vessels and submersibles to permit said vessels to be propelled through a body of water. Vessels constructed in accordance with the details set forth herein may ply the high seas, rivers, harbors and any and all waterways which are of sufficient depth to float passenger and commercial vessels of every description.

It is a further object of this invention to provide a thermal atomic reactor, of a suitable type, in the foresection of a vessel for generating heat and ultimately steam for release against the water in the wake of the vessel. The thermal atomic reactor utilized is preferably one that employs the use of fissionable materials for the generation of heat, such as gas-cooled (helium) graphite-moderated reactor, or the like, or a heavy-water-moderated and cooled reactor, or the like, which are of sufficient capacity to generate high temperature coolant for the purpose of creating a large volume of saturated steam through high pressure explosion for propulsion of the vessel by direct thrusts of the steam pressure through manifold ports provided and against the hind-waters of the vessel.

It is a more particular object of this invention to provide novel propulsion means for water vessels which includes the generation of high pressure steam which is permitted to escape through selective ports of a plurality of manifold ports. Remotely controlled shutters are employed to allow the vessel operator to selectively open certain manifold ports while leaving others sealed by the shutters. The manifold ports are positioned at the stern of the vessel hull and permit communication between the explosion chamber in which the high pressure steam is generated and the water in the wake of the vessel. Dependent upon the number of manifold ports which are open, the vessel may be propelled at any desired speed. Moreover, inasmuch as certain manifold ports are spaced from the longitudinal axis defined by the vessel, escape of high pressure steam therethrough allows the vessel operator to steer the vessel inasmuch as impact of the escaping steam against the hind waters will result in a turning moment on the vessel if the escaping steam is not in alignment with the longitudinal vessel axis.

It is a still more particular object of this invention to provide a plurality of pressure relief valves in communication with the explosion chamber for permitting the escape of excess steam when the pressure within the chamber exceeds a predetermined amount.

It is a still more particular object of this invention to provide a turbulator at the stern portion of the vessel hull immediately adjacent the manifold port for agitating the hind-waters so as to establish a resistance whirlpool against which the escaping steam may strike.

It is a still more particular object of this invention to provide manifold ports so arranged as to allow submersibles to dive or rise dependent on the selective ports exposed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of a conventional vessel illustrating in dotted lines portions of the propulsion means disposed below deck forming this invention, showing particularly the thermal atomic reactor and a pair of forwardly diverging water scoops which permit water to enter the vessel and the explosion chamber above the reactor for the generation of high pressure steam explosions;

FIGURE 2 is a side elevational view of the vessel again showing in dotted lines portions of the thrust propulsion means;

FIGURE 4 is a front elevational view of the vessel particularly showing the water inlet scoops;

Figure 3:
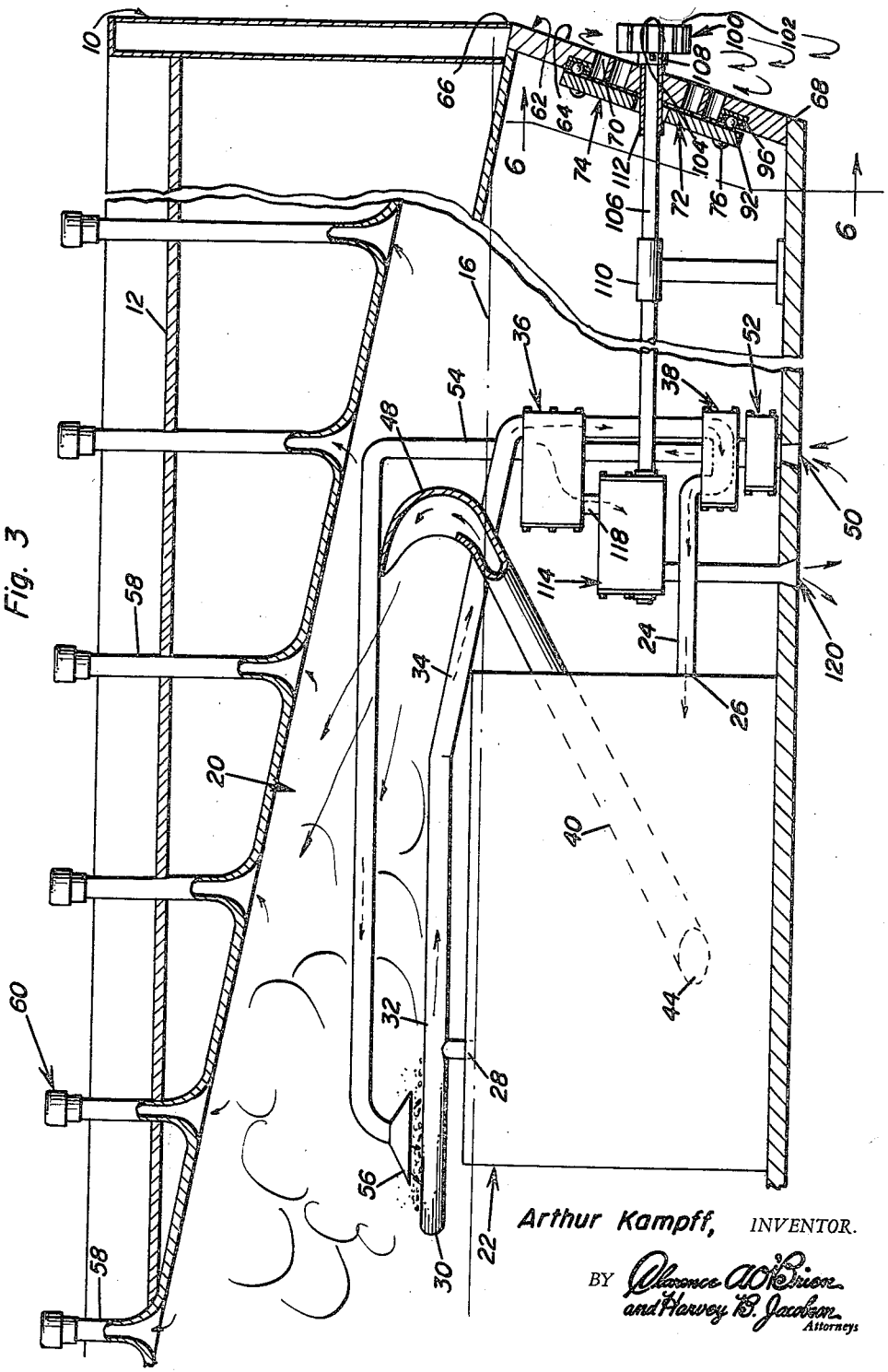
FIGURE 3 is an enlarged sectional view taken substantially along the plane 3—3 of FIGURE 1 and illustrating the details of the propulsion means.

FIGURE 5 is a rear elevational view particularly illustrating the manifold and showing the manifold ports and turbulator positioned thereat; and FIGURE 6 is an enlarged sectional view taken substantially along the plane 6—6 of FIGURE 3 illustrating the movable manifold shutters utilized to selectively seal and open manifold ports adapted to communicate the explosion chamber within the vessel with the hind-waters or wake in which the vessel floats.

With continuing reference to the drawings, numeral 10 generally represents the hull of a ship or vessel. The deck is indicated by the numeral 12 and the stern portion generally designated by the numeral 14. With an average load, the displacement is such that numeral 16 indicates the waterline or surface of the water with respect to the vessel 10.

A steam explosion dome or chamber 20 is defined in the vessel 10 somewhere beneath the deck 12. Mounted within the chamber 20 is a thermal atomic reactor 22 shown substantially in block form in FIGURES 1 through 3. The thermal atomic reactor 22 is utilized herein for the generation of high pressure saturated steam and may be of the Breeder type for the continuous production of fissionable material such as thorium, plutonium or the like. The Breeder reactor will produce more fissionable material than it burns whether it is the same or a different material. Being a fast neutron reactor, it will produce an excess of fissionable material above its own requirements.

Coolant tubes 24 enter the reactor 22 at inlet 26 and emerge therefrom at 28. An oval-shaped coolant tube 30 is in communication with the tube 28 emerging from the reactor 22. The oval-shaped coolant tube 30 defines a flat upper surface 32 in the explosion chamber 20 for purposes to be more particularly described below. Tubes 34 extend between the oval-shaped coolant tube 30 through a heat exchanger 36, a coolant pump 38, and back to the coolant inlet 26. A helium coolant is carried within the coolant tubes and is circulated in the direction indicated by the arrows in FIGURE 3 through the tubes. The helium coolant emerges at 28 from the reactor at a high temperature such that it heats the coolant tube 30 white hot. The coolant flows through the oval-shaped metal channel coolant tube 30 under pressure of coolant pump 38 and completes the cycle by returning to the lower coolant inlet 26 disposed at the bottom of the reactor. The purposes of the heat exchanger 36 will be discussed in detail below.

A pair of forwardly diverging water scoops 40 and 42 are open at 44 and 46 on the sides of the hull beneath the waterline 16. As the vessel 10 is moving toward the left, FIGURES 1 through 3, water is drawn through the scoops 40 against the bowed shield 48. The water striking the shield 48 is sprayed forwardly in the manner suggested by the arrows and strikes the flat surface 32 of the oval-shaped coolant tube 30. When the cold water strikes the white hot oval-shaped tube 30, there is an instant formation of saturated steam and the generation of high steam pressure.

Another water inlet 50 is disposed in the bottom of the vessel and a water pump 52 draws water up therethrough, forcing the water through a feed water line 54. The feed water line 54 terminates in a water spout 56 immediately above the flat portion of the white hot coolant tube 30. The continual water flow through the line 54 and continual distribution of the water through the spout 56 causes the constant unending creation of a supply of high pressure steam within the chamber 20. In order to prevent excess pressure build-up within the chamber 20, a plurality of explosion pressure ducts 58 communicate with the chamber 20 and project well above the vessel deck 12. Each of the explosion pressure ducts 58 terminates in a substantially conventional pressure relief valve 60. Accordingly, it will be appreciated that although an unending supply of high pressure steam is created by the water drawn through the scoops 40 and 42 and the water drawn by pump 52 through the waterline 54 exploding on the white hot coolant tube 30, excess build-up in the chamber 20 will be prevented by the proper operation of the relief valves 60 terminally disposed on the explosion pressure ducts 58.

In order to utilize the high pressure steam generated within the pressure chamber 20, means are provided for releasing the steam through a manifold 62 supported at the stern portion 14 of the vessel 10. The manifold 62 includes a frame 64 which is securely held to the surfaces of the vessel 10 at for example 66 and 68 in sealed relationship. It will be appreciated that the manifold frame 64 is disposed well below the minimum waterline 16. The manifold frame 64 defines a plurality of manifold ports 70 which may be best seen in FIGURE 6. The manifold ports 70 permit communication between the chamber 20 and the water in the wake of the vessel for permitting an impact between the high pressure steam and the hind-waters which causes the resultant propulsion of the vessel with respect to the hind-waters. The plurality of manifold ports 70 are arranged so that several are spaced from the longitudinal axis of the vessel. A pair of quadrant shaped manifold shutters 72 and 74 are employed within the chamber 20 for permitting the selective opening or sealing of the manifold ports 70. The quadrant shaped manifold shutters 72 and 74 are pivoted on pins 76 and the shutters are provided with a rearwardly extending projection 78 which may be terminally pivoted to an extensible arm 80 of for instance a hydraulic motor 84 which may be controlled through lines 86 and 88 by the vessel operator located at a position remote therefrom. By selective actuation of the controls by the operator, the hydraulic motor 84 will be actuated to extend the arm 80 a particular distance resulting in the opening of certain manifold ports 70, or the closing of certain ports. Assume initially that the shutters 72 and 74 are disposed in their solid line position illustrated in FIGURE 6 with all of the ports 70 sealed so that steam pressure from the chamber 20 is not permitted to escape through the ports against the vessel hind-waters. By actuating hydraulic motor 84 operatively connected to shutter 72, the shutter 72 may be moved to the dotted line position for the purpose of exposing the first two manifold ports which are positioned to the left of the longitudinal vessel axis permitting escape of high pressure steam generated in the chamber 20 through the exposed or opened ports which will cause both a forward vessel movement as the steam strikes the hind-waters and will also cause the vessel to pivot toward the left as a turning moment is created. The hydraulic motor 90 associated with shutter 74 may be energized in a similar manner to expose manifold ports for pivoting the vessel to the right. It will be appreciated that if the shutters 72 and 74 are operated together, the resultant force provided by the impact of the high pressure steam against the hind-waters will be parallel to the longitudinal axis. The speed of the vessel may be determined by the amount of high pressure steam which is permitted to escape from the chamber 20 which of course is determined by the number and size of the manifold ports opened. It is not of course necessary to limit the number of manifold shutters to two and of course a greater or lesser number of manifold ports may be employed depending on the size of the vessel. Ball bearings 92 are disposed in a trackway 96 which may be recessed in the manifold 62 for facilitating the movement of shutters 72 and 74 thereover.

In order to allow the impact of the escaping steam from the chamber 20 against the hind-water to be most effective, a turbulator 100 is provided. The turbulator 100 includes a rotor 102 provided with flat blades 104. The rotor 102 is secured to shaft 106 by collar and setscrew 108. The shaft 106 rotatably extends through bearings 110 and 112. On the end of the shaft 106 remote from the rotor 102, a steam turbine enclosed in housing 114 is provided. Water entering through inlet 50 and passing through pump 52 and feed waterline 54 is diverted from heat exchanger 36, after it is created to steam by the hot coolant passing through tube 34, and is passed as steam through pipe 118 for operating the turbine. A steam outlet 120 permits the steam to be exhausted through the water to the atmosphere. The rotor 102 having the flat straight blades 104 carries the hind-waters around in a spinning motion, thereby setting up a resistance whirlpool against which the high pressure steam strikes for propelling the vessel forwardly. The use of the turbulator diminishes the possibility of a blow through of the steam through the water. Moreover, the resistance whirlpool formed increase the effectiveness and efficiency of the propulsion.

From the foregoing, it will be appreciated that novel propulsion means for a water vessel have been proposed wherein a thermal atomic reactor is employed to generate high pressure steam from water which enters the vessel chamber from the body of water in which the vessel floats. Controlled means are provided for permitting the escape of the high pressure steam against the hind-waters for propelling the vessel forwardly. In addition, a turbulator is employed to create a resistance whirlpool for increasing the effectiveness and efficiency of the propelling impact between the escaping steam of the hind-waters.

Besides the steering function afforded when the steam is allowed to escape through manifold ports spaced laterally from the longitudinal axis, a submersible may be placed in a powered dive or rise if selective manifold ports are opened above or below the longitudinal axis.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a vessel including a hull defining a stern portion, means for propelling said vessel through a body of water comprising a chamber defined in said vessel, a water inlet in communication with said chamber, steam generating means for converting water entering said chamber into steam, and means controlling the escape of said steam through said portion whereby the impact of said escaping steam against the body of water in the wake of the vessel propels said vessel forwardly, said means controlling the escape of said steam through said stern portion including a manifold defining a plurality of groups of spaced manifold ports communicating said chamber with the body of water in the wake of said vessel, a movable manifold shutter superposed over said manifold ports of each group in sealed relationship and means for selectively moving said manifold shutters and selectively exposing certain ones of said manifold ports.

2. The combination of claim 1 wherein the manifold ports of each group are arranged in an arcuate line, one end of which extends substantially vertical and the other end of which extends substantially horizontal, one of said groups being disposed generally below the medial longitudinal axis of said hull and to one side thereof, and a second of said groups being disposed generally above the medial longitudinal axis of said hull and to the other side thereof.

3. The combination of claim 2 wherein said groups are outwardly concave and each manifold shutter is quadrant shaped, the wider end thereof being sufficient so as to seal off all of the ports in a single group, and each of said shutters being pivotally mounted adjacent its apex for exposing any predetermined number of said ports beginning from either end of said arcuate line of ports, thereby controlling both the direction and the speed of the vessel.

4. In combination with a vessel including a hull defining a stern portion, means for propelling said vessel through a body of water comprising a chamber defined in said vessel, an atomic reactor in said chamber, a coolant tube in said chamber and in communication with said reactor, a coolant in heat exchange relationship with said reactor circulating in said coolant tube, scoop means for introducing water into said chamber and into contact with said tube so as to convert the water into steam, means for controlling the escape of said steam through the stern portion, a second means for introducing water into contact with said tube, said second means including a water inlet, a water pump for drawing water therethrough, a feed water line extending from said water pump into overlying relation to said coolant tube, and a discharge spout on said water line directing the water onto said tube, a plurality of pressure relief valves in communication with said chamber permitting the escape of excess steam, and means for creating an increased resistance to the escape of said steam, said increased resistance being located rearwardly of said stern portion.

5. The combination of claim 1 including means for establishing an increased resistance in said body of water to the escape of steam.

6. In combination with a vessel including a hull, steam generating means disposed in said hull, steam discharge means opening through said hull below the waterline thereof, and means for establishing an increased resistance to the discharge of steam exterior of said discharge means, said means for establishing an increased resistance including a radial discharge turbine wheel mounted for rotation about an axis generally paralleling the direction in which said discharge means opens and so as to create a spinning movement of the water thus resulting in a resistance whirlpool in a plane perpendicular to the discharged steam exterior of the vessel hull.

7. In combination with a vessel including a hull defining a stern portion, means for propelling said vessel through a body of water comprising a chamber defined in said vessel, an atomic reactor in said chamber, a coolant tube in said chamber and in communication with said reactor, a coolant in heat exchange relationship with said reactor situated in said coolant tube, scoop means for introducing water into said chamber and into contact with said tube so as to convert the water into steam, means for controlling the escape of steam through the stern portion, a second means for introducing water into contact with said tube, said second means including a water inlet, a water pump for drawing water therethrough, a feed water line extending from said water pump into overlying relation to said coolant tube, and a discharge spout on said water line directing the water onto said tube, and a plurality of pressure release valves in communication with said chamber permitting the escape of excess steam.

References Cited in the file of this patent

UNITED STATES PATENTS

| | | |
|---|---|---|
| 638,211 | Boes | Dec. 5, 1899 |
| 891,214 | Graf | June 16, 1908 |
| 2,534,817 | Hedden | Dec. 19, 1950 |

FOREIGN PATENTS

| | | |
|---|---|---|
| 440,232 | Italy | Oct. 9, 1948 |

OTHER REFERENCES

Peaceful Uses of Atomic Energy, vol 7, Reactor Technology, United Nations, Sept. 13, 1958, page 832.

Peaceful Uses of Atomic Energy, vol. 8, Nuclear Power Plants, part 1. United Nations, Sept. 13, 1958, page 207.

Space-Aeronautics, January 1960, pages 68–71.